(12) United States Patent
Kato

(10) Patent No.: US 10,472,000 B2
(45) Date of Patent: Nov. 12, 2019

(54) CARPET SUPPORTING MEMBER MOUNTING STRUCTURE

(71) Applicant: TOYOTA BOSHOKU KABUSHIKI KAISHA, Aichi-ken (JP)

(72) Inventor: Akinori Kato, Aichi-ken (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 38 days.

(21) Appl. No.: 15/797,783

(22) Filed: Oct. 30, 2017

(65) Prior Publication Data
US 2018/0127033 A1      May 10, 2018

(30) Foreign Application Priority Data

Nov. 9, 2016   (JP) .................................. 2016-218721

(51) Int. Cl.
  *B62D 25/20*   (2006.01)
  *B60R 13/08*   (2006.01)
  *B60N 3/04*    (2006.01)
  *B62D 25/14*   (2006.01)

(52) U.S. Cl.
  CPC ............ *B62D 25/20* (2013.01); *B60N 3/046* (2013.01); *B60R 13/083* (2013.01); *B60R 2013/0807* (2013.01); *B62D 25/145* (2013.01)

(58) Field of Classification Search
  CPC .... B62D 25/20; B62D 25/145; B60R 13/083; B60R 2013/0807; B60N 3/046

USPC .................................................... 296/193.07
See application file for complete search history.

(56) References Cited

U.S. PATENT DOCUMENTS 6,974,172 B2* 12/2005 Gebreselassie ....... B60R 13/083
                                                  180/90

FOREIGN PATENT DOCUMENTS

JP       2012-153185       8/2012

* cited by examiner

*Primary Examiner* — Joseph D. Pape
*Assistant Examiner* — Dana D Ivey
(74) *Attorney, Agent, or Firm* — Greenblum & Bernstein, P.L.C.

(57) ABSTRACT

A carpet supporting member mounting structure for mounting a carpet supporting member to an instrument panel assembly to support a floor carpet including a portion to cover a tunnel portion of a floor panel of a vehicle includes a mounting portion of the instrument panel assembly and a carpet supporting member. The carpet supporting member includes a supporting member body disposed to project from an upper edge of a sidewall of the tunnel portion and a mounting protrusion protruding from a front edge of the supporting member body and including a base portion and a distal end portion. The base portion is inserted in a mounting hole of the mounting portion. The distal end portion extends from a distal end of the base portion toward a front of the vehicle and is pressed against a hole edge of the mounting hole in the width direction of the vehicle.

18 Claims, 11 Drawing Sheets

US 10,472,000 B2

CARPET SUPPORTING MEMBER MOUNTING STRUCTURE

CROSS REFERENCE TO RELATED APPLICATION

This application claims priority from Japanese Patent Application No. 2016-218721 filed on Nov. 9, 2016. The entire contents of the priority application are incorporated herein by reference.

TECHNICAL FIELD

The present disclosure relates to a carpet supporting member mounting structure.

BACKGROUND

A floor assembly for a vehicle includes a floor panel and a floor carpet that covers the floor panel. The floor carpet is formed in a shape along a shape of an upper surface of the floor panel and supported by the surface of the floor panel. The floor carpet includes a protruding portion along a shape of a tunnel portion of the floor panel.

A functional component may be disposed over the tunnel portion with a space between the functional component and the tunnel portion. To improve an appearance of the interior of the vehicle, the space may be cover up with a portion of the floor carpet. Because of the space, the tunnel portion cannot support the portion of the floor carpet. Therefore, a supporting member for supporting the portion of the floor carpet may be required. If fastener clips or other types of fixing members are used for mounting the supporting member to other component, the number of parts or the number of steps for installing the floor carpet in the vehicle increases.

SUMMARY

The present invention was made in view of the foregoing circumstances. An object is to provide a carpet supporting member mounting structure that requires less mounting parts for mounting the carpet supporting member.

A carpet supporting member mounting structure for mounting a carpet supporting member to an instrument panel assembly to support a floor carpet including a portion to cover a tunnel portion of a floor panel of a vehicle includes a mounting portion of the instrument panel assembly and a carpet supporting member. The mounting portion of the instrument panel assembly including a mounting hole that is a through hole opening in a width direction of the vehicle. The carpet supporting member includes a supporting member body and a mounting protrusion. The supporting member body has a plate shape. The supporting member body is disposed to project from an upper edge of a sidewall of the tunnel portion. The supporting member body includes a supporting surface to support the floor carpet from one side in the width direction of the vehicle. The mounting protrusion protrudes from a front edge of the supporting member body. The mounting protrusion includes a base portion and a distal end portion. The base portion is inserted in the mounting hole. The distal end portion extends from a distal end of the base portion toward a front of the vehicle and is pressed against a section of a hole edge of the mounting hole in the width direction of the vehicle.

According to the configuration, the carpet supporting member mounting structure that requires less mounting parts for mounting of the carpet supporting member is provided.

DETAILED DESCRIPTION

Figure 1:
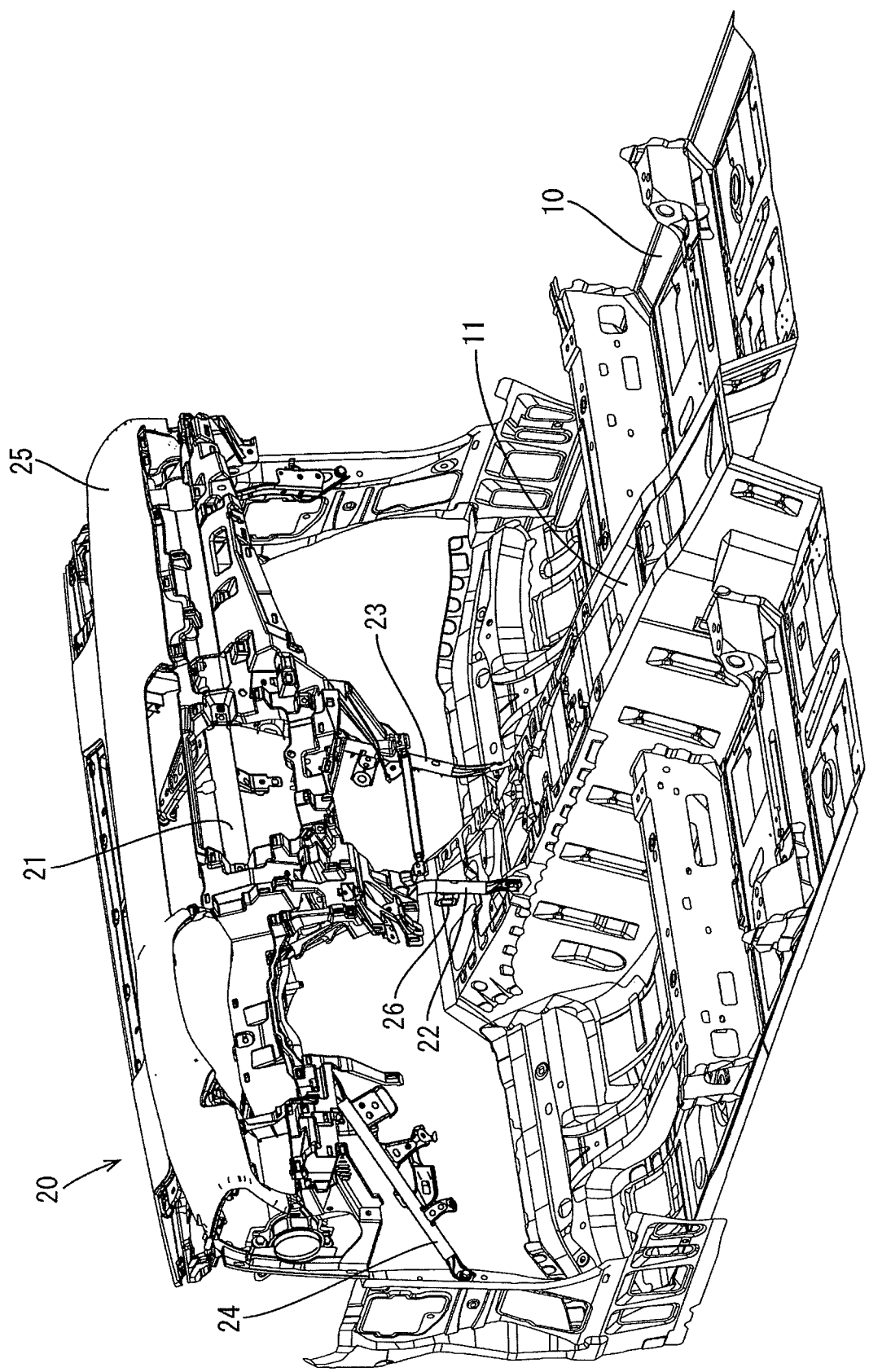
FIG. 1 is a perspective view illustrating a floor panel and an instrument panel.

An embodiment will be described with reference to FIGS. 1 to 11. A floor panel 10 for a vehicle illustrated in FIG. 1 is made of metal. The floor panel 10 has a rectangular shape that is elongated in the front-rear direction of the vehicle in a plan view. The floor panel 10 includes a tunnel portion 11 in the middle in the width direction of the vehicle. The tunnel portion 11 extends in the front-rear direction of the vehicle and protrudes upward.

Figure 2:
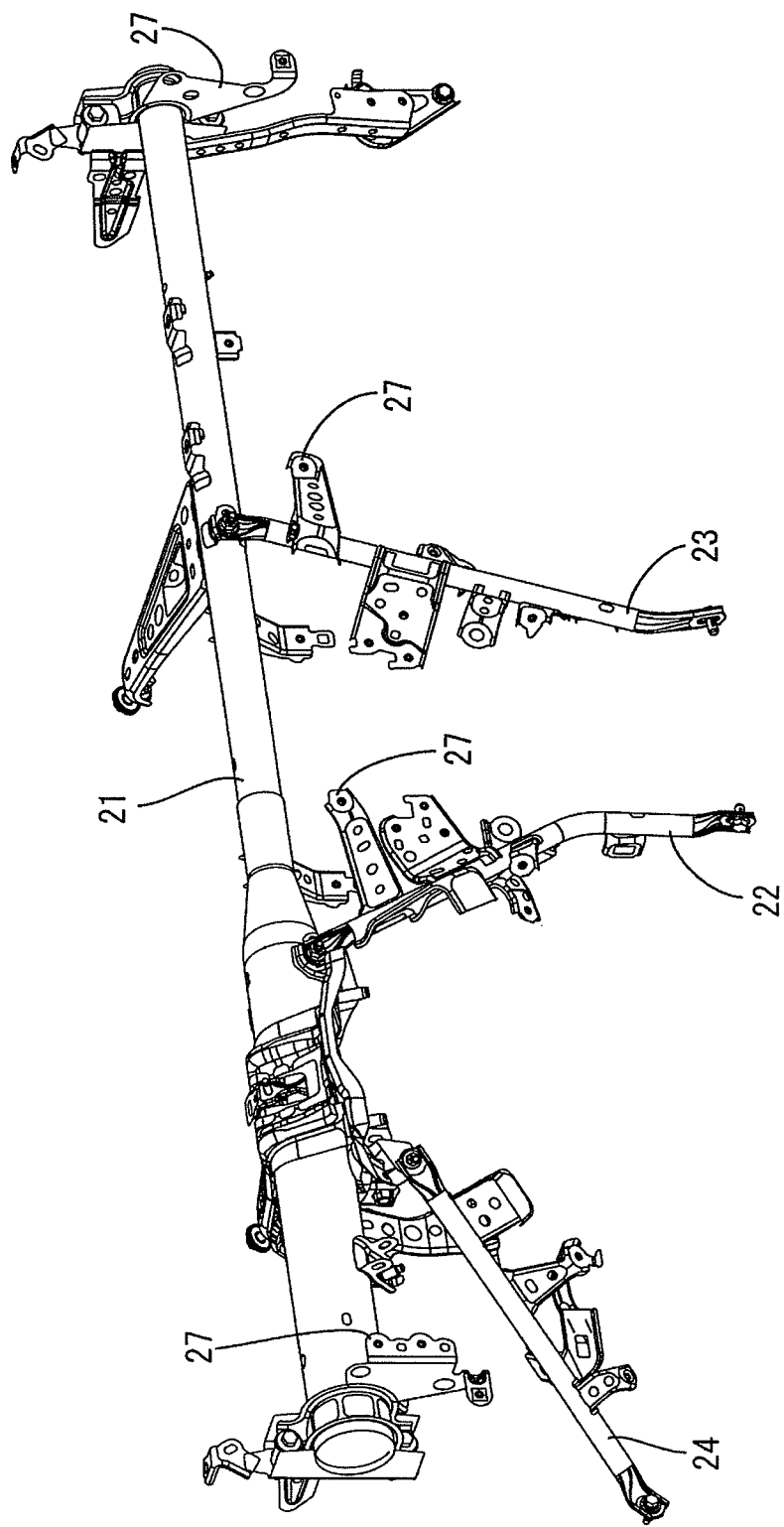
FIG. 2 is a perspective view illustrating a reinforcing shaft and braces.

As illustrated in FIGS. 1 and 2, an instrument panel assembly 20 has an elongated shape in the width direction of the vehicle. The instrument panel assembly 20 is disposed over a front portion of the floor panel 10 (including a section of the tunnel portion 11). The instrument panel assembly 20 includes at least a reinforcing shaft 21 (see FIG. 2, also referred to as an instrument panel reinforcing shaft) made of metal, a first brace 22, a second brace 23, a third brace 24 (also referred to as instrument panel braces), and an upper instrument panel component 25. The reinforcing shaft 21 extends in the width direction of the vehicle. The first brace 22, the second brace 23, and the third brace 24 are metal columnar members for supporting the reinforcing shaft 21. The upper instrument panel component 25 is mounted to the reinforcing shaft 21 from the rear side of the vehicle. The upper instrument panel component 25 forms a section of a design surface.

The upper instrument panel component 25 (a panel body) is a synthetic resin panel component that forms an upper portion of the instrument panel. The upper instrument panel component 25 covers the reinforcing shaft 21 from the rear side of the vehicle. Furthermore, the upper instrument panel component 25 and a lower instrument panel component form a design surface of the instrument panel. The first brace 22 and the second brace 23 include lower end portions connected to the tunnel portion 11 and extend upward from the tunnel portion 11. The first brace 22 and the second brace 23 include upper ends connected to the reinforcing shaft 21. The third brace 24 connects the reinforcing shaft 21 to a side of the floor panel 10. Brackets 27 are provided on the reinforcing shaft 21, the first brace 22, and the second brace 23 for mounting of the upper instrument panel component 25.

Figure 3:
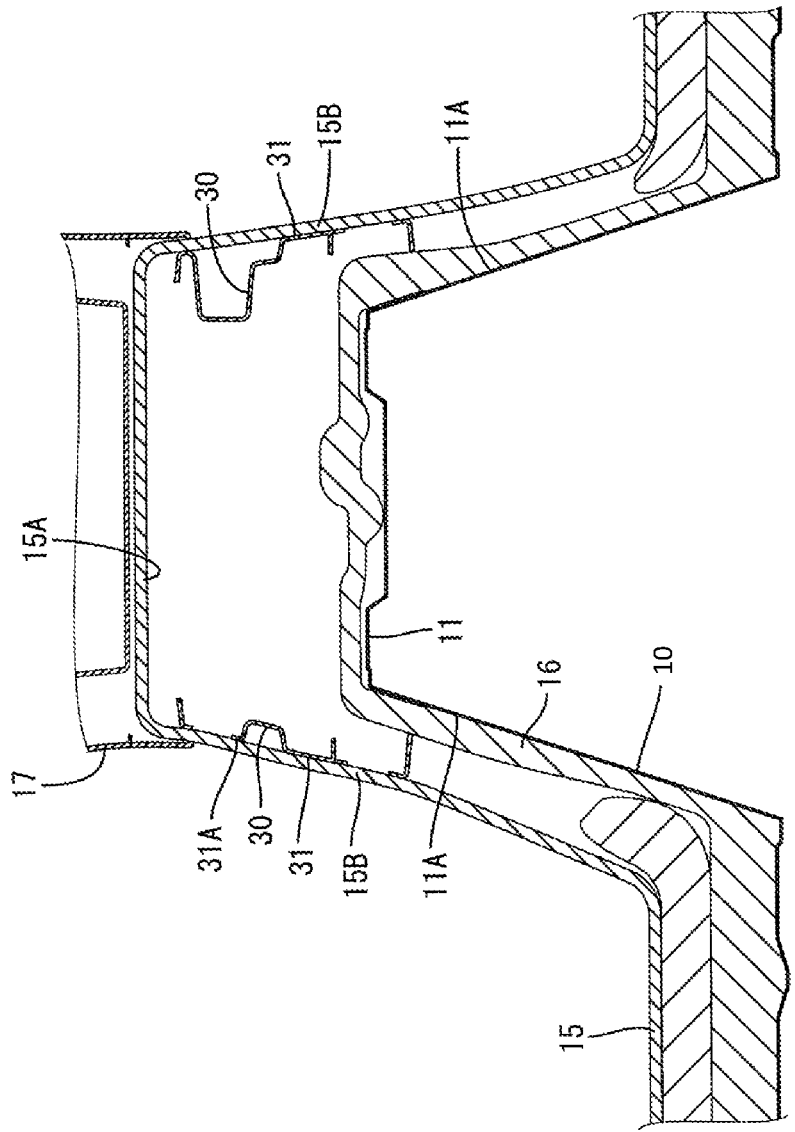
FIG. 3 is a cross-sectional view illustrating a tunnel portion of a floor panel and therearound.

As illustrated in FIG. 3, a floor carpet 15 is disposed on the floor panel 10 to cover the floor panel 10 from above in the vehicle. A floor silencer 16 is disposed between the floor panel 10 and the floor carpet 15. The floor silencer 16 has noise absorbing properties and noise blocking properties. The floor carpet 15 is formed in a shape along the top surface of the floor panel 10. Namely, a portion of the floor carpet 15 corresponding to the tunnel portion 11 is configured as a protruding portion 15A that protrudes upward. A floor console is disposed above the tunnel portion 11.

A floor console 17 is disposed above the top surface of the tunnel portion 11 with a space between the floor console 17 and the top surface of the tunnel portion 11. The space is covered with an upper section of the protruding portion 15A of the floor carpet 15. A space is provided between a top wall of the protruding portion 15A and a top wall of the tunnel portion 11. The floor carpet 15 is supported from underneath by the floor panel 10 except for the protruding portion 15A. Because the space is provided between the top wall of the protruding portion 15A and the top wall of the tunnel portion 11, the protruding portion 15A cannot be directly supported by the tunnel portion 11.

This embodiment includes a pair of carpet supporting members 30 disposed on the tunnel portion 11. The carpet supporting members 30 support sidewalls 15B of the protruding portion 15A of the floor carpet 15 from sides. Namely, the carpet supporting members 30 are opposed to each other in the width direction of the vehicle. The carpet supporting member 30 on the left is fixed to the first brace 22 and the carpet supporting member 30 on the right is fixed to the second brace 23. The carpet supporting members 30 have the same configuration and thus the carpet supporting member 30 on the left and its mounting structure will be described.

Figure 4:
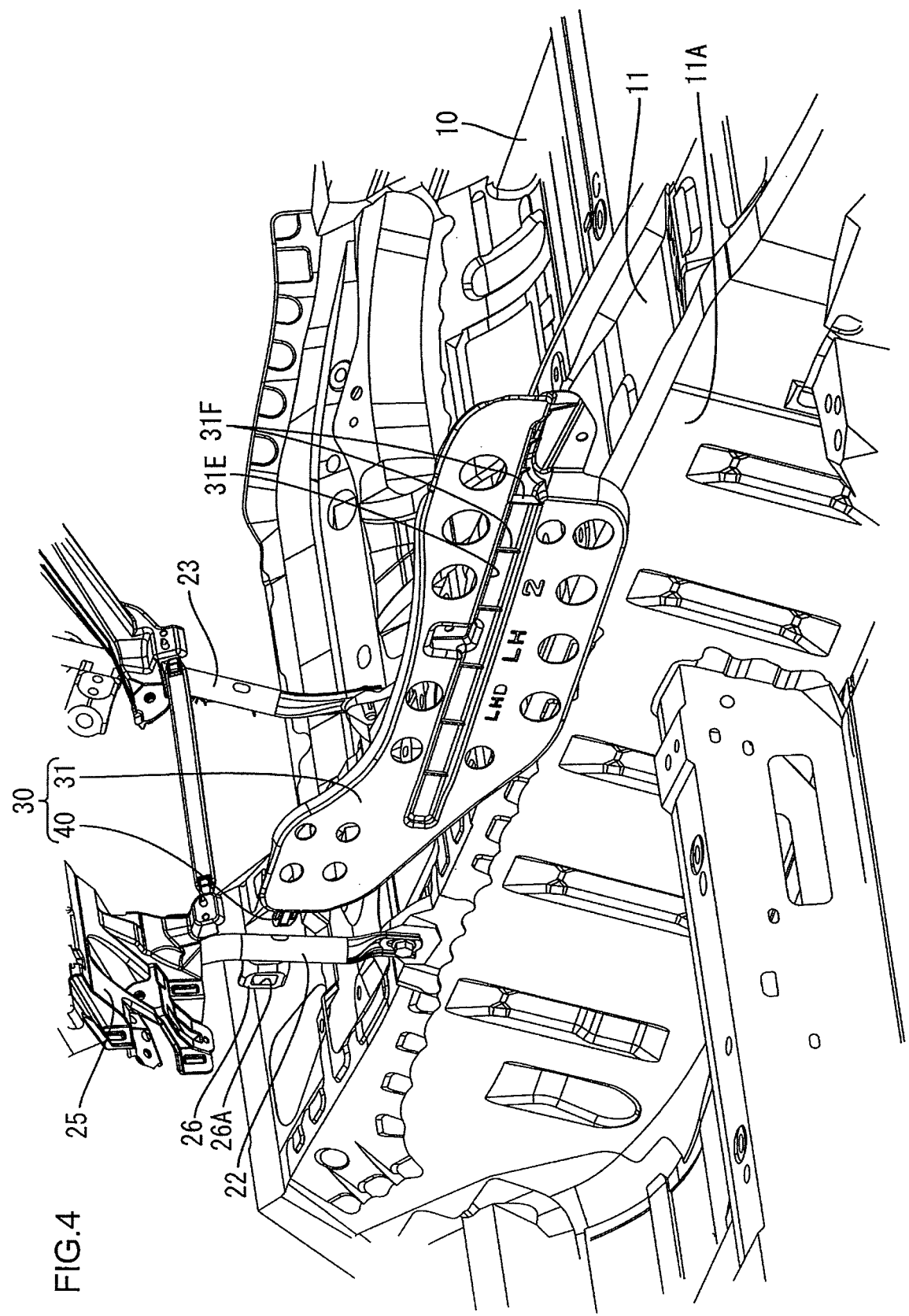
FIG. 4 is an exploded perspective view illustrating a carpet supporting member mounting structure.
Figure 5:
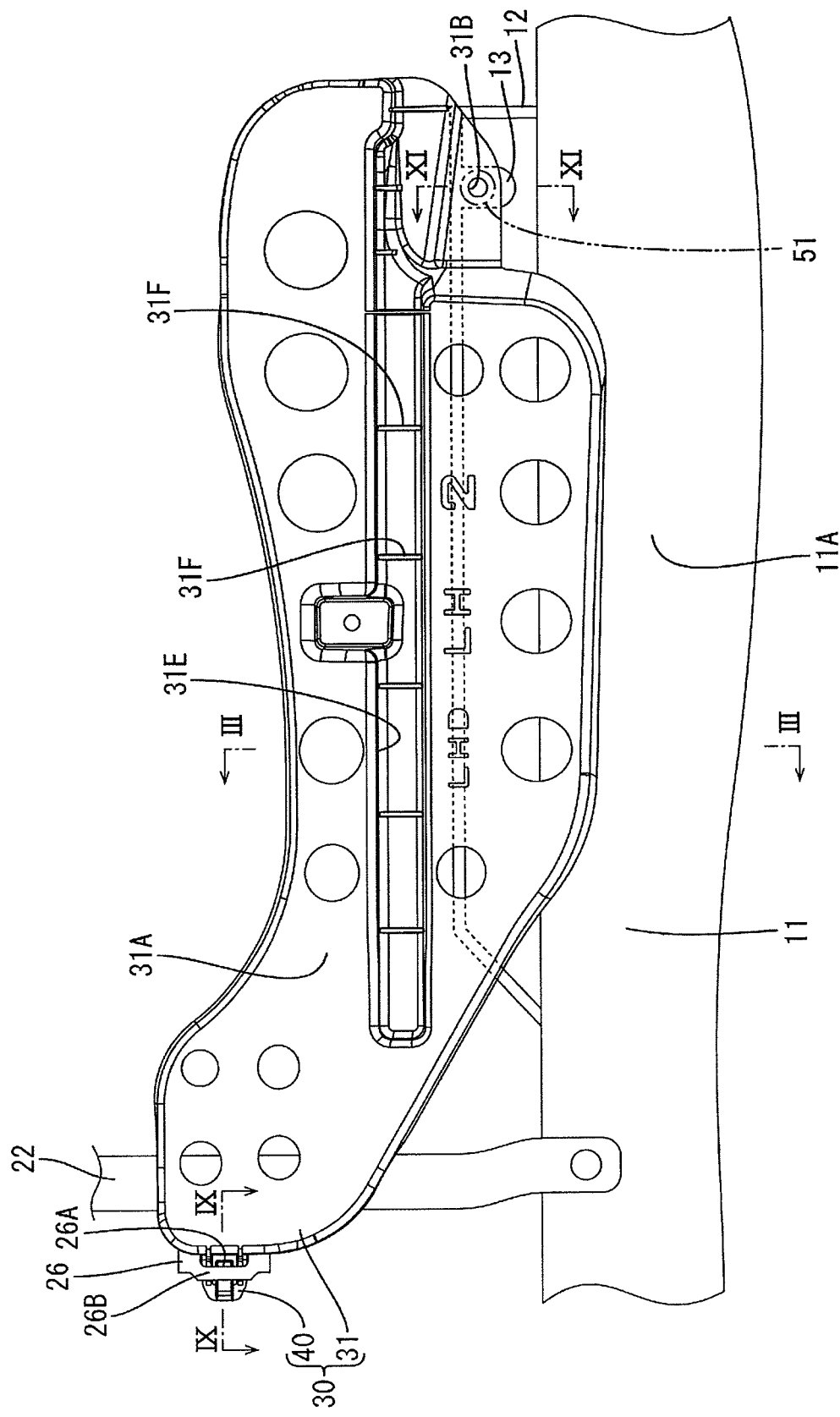
FIG. 5 is an elevation view illustrating the carpet supporting member mounting structure.

As illustrated in FIGS. 4 and 5, the carpet supporting member 30 includes a supporting member body 31 and a mounting protrusion 40. The supporting member body 31 having a plate shape projects upward from an upper edge of the sidewall 11A of the tunnel portion 11. The mounting protrusion 40 projects from a front edge of the supporting member body 31. The mounting protrusion 40 is inserted into a mounting hole 26A of a bracket 26 that projects from a periphery of the first brace 22. The supporting member body 31 extends in the front-rear direction of the vehicle. A surface of the supporting member body 31 on the exterior side of the vehicle is configured as a supporting surface 31A for supporting a back surface of the sidewall 15B from the interior side (the upper side in FIG. 9). As illustrated in FIG. 3, a lower portion of the supporting member body 31 is disposed on an outer side relative to the sidewall 11A of the tunnel portion 11 to overlap the upper portion of the sidewall 11A. A middle portion of the supporting member body 31 with respect to the vertical direction includes a groove 31E that extends in the front-rear direction of the vehicle. Ribs 31F are formed in the groove 31E.

Figure 6:
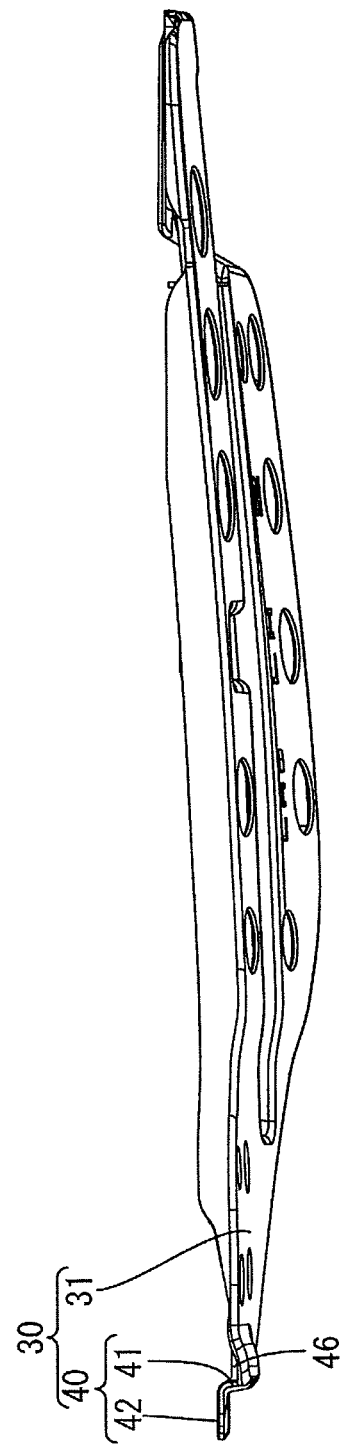
FIG. 6 is a plan view illustrating a carpet supporting member.
Figure 7:
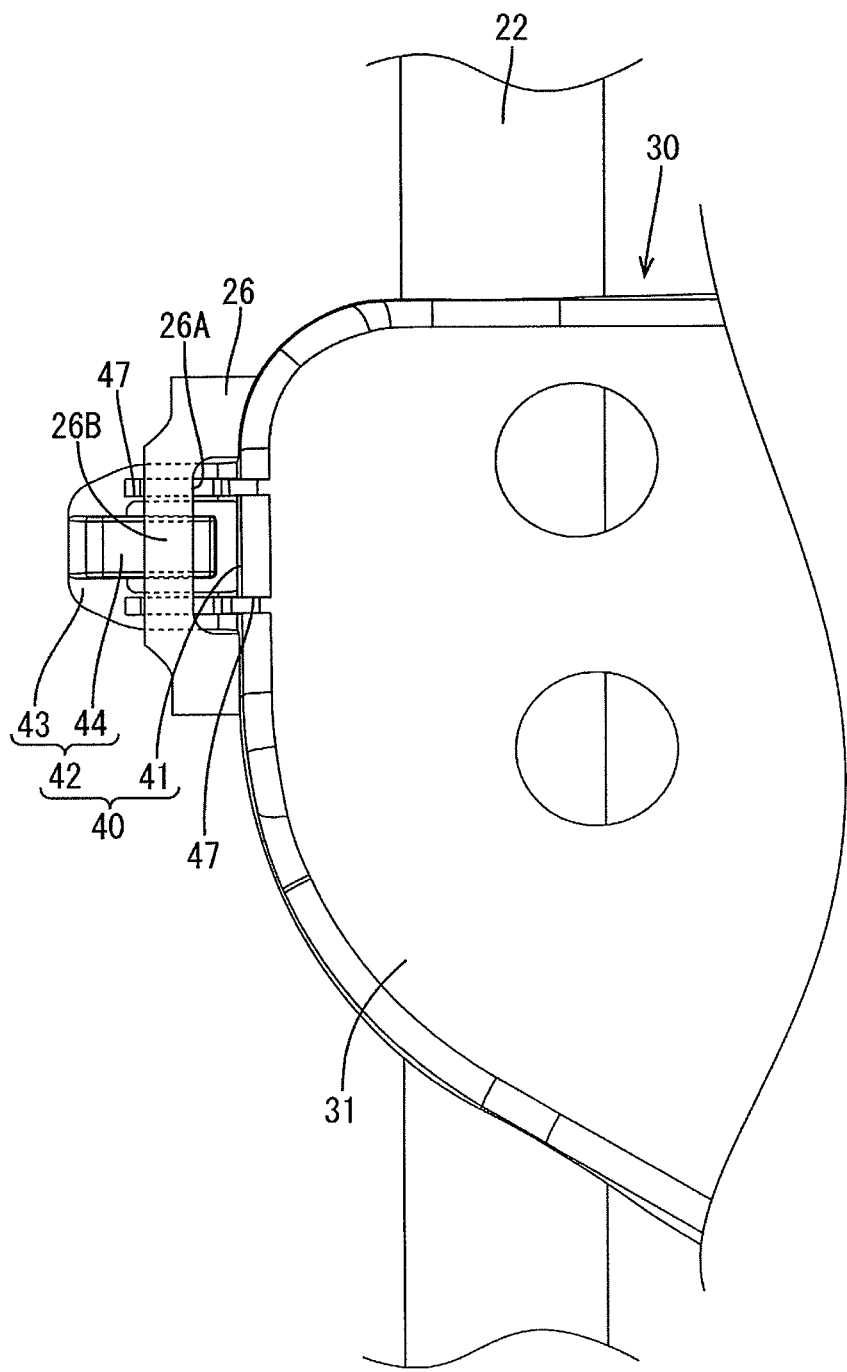
FIG. 7 is a magnified view illustrating a portion of the carpet supporting member including a mounting protrusion.
Figure 8:
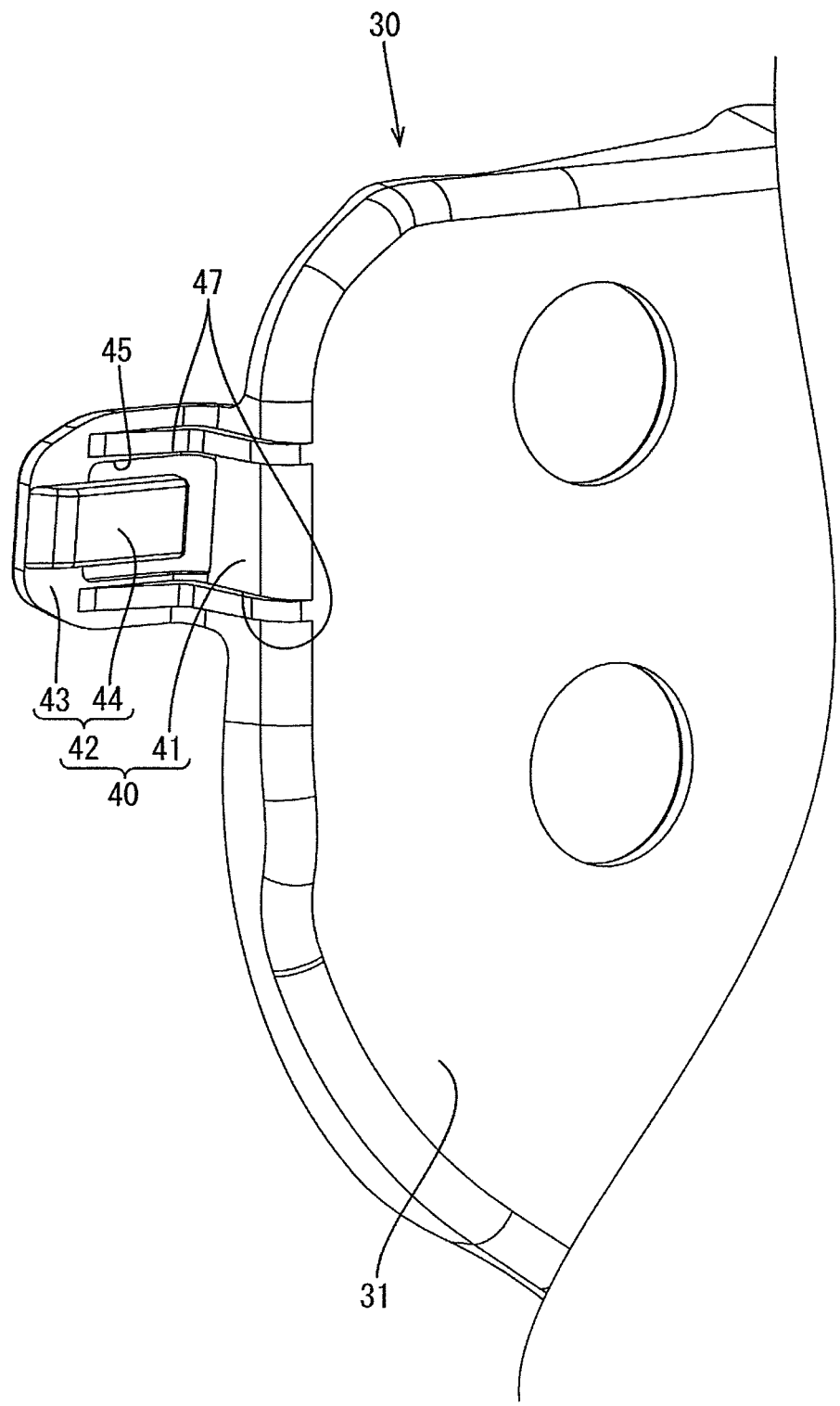
FIG. 8 is a perspective view illustrating the portion of the carpet supporting member including the mounting protrusion.
Figure 9:
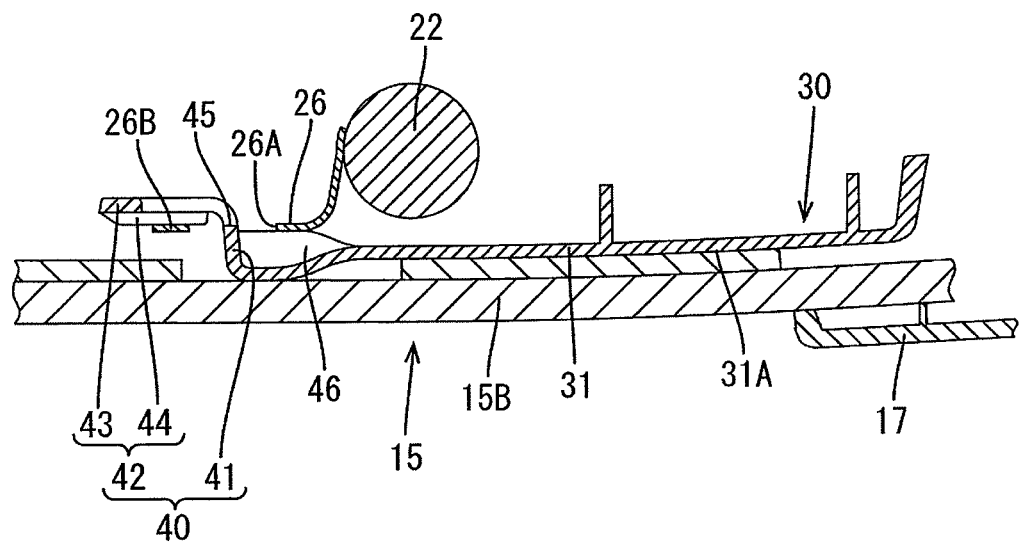
FIG. 9 is a cross-sectional view illustrating the portion of the carpet supporting member including the mounting protrusion along line IX-IX in FIG. 5.

As illustrated in FIGS. 7 and 9, the bracket 26 extends from the first brace 22 toward the front of the vehicle (the left in FIG. 9). The bracket 26 includes the mounting hole 26A that is a through hole opening in the width direction of the vehicle (the vertical direction in FIG. 9). As illustrated in FIGS. 6 and 8, the mounting protrusion 40 includes a base portion 41 and a distal end portion 42. The base portion 41 extends from the front edge of the supporting member body 31 to the opposite side from the supporting surface 31A. The distal end portion 42 extends from a distal end of the base portion 41 toward the front of the vehicle. As illustrated in FIG. 9, the base portion 41 is inserted into the mounting hole 26A from the supporting member body 31 side. The distal end portion 42 is pressed against the hole edge 26B of the mounting hole 26A from the opposite side from the supporting member body 31 side (the upper side in FIG. 9).

The distal end portion 42 includes a first extending section 43 and a second extending section 44. The first extending section 43 extends from the distal end of the base portion 41 toward the front of the vehicle. The second extending section 44 extends from the first extending section 43 to return toward the base portion 41. The second extending section 44 is pressed against the hole edge 26B of the mounting hole 26A. The second extending section 44 is a flexible tab that is elastically flexible in the width direction of the vehicle. As illustrated in FIG. 8, a cutout 45 is formed in an area from the base portion 41 to the first extending section 43. Furthermore, one of the ends of the second extending section 44 is a fixed end that is fixed to the distal end of the first extending section 43 and the other end of the second extending section is a free end that is not fixed to the first extending section 43 and hangs over the cutout 45 of the first extending section 43. According to the configuration, bending of the second extending section 44 toward the first extending section 43 is allowed.

As illustrated in FIG. 9, a rib 46 protrudes from the back surface of the supporting member body 31 (on the upper side in FIG. 9) and includes an edge connected to the base portion 41. As illustrated in FIG. 8, grooves 47 are formed on sides of the cutout 45, respectively, to extend from the base portion 41 to the first extending section 43.

Figure 11:
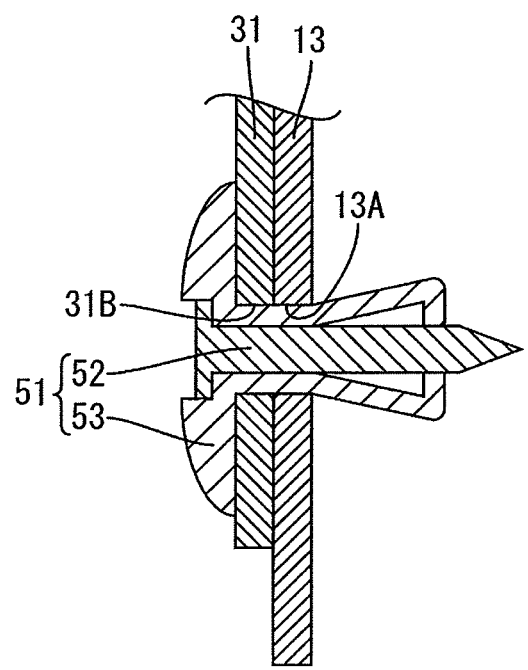
FIG. 11 is a cross-sectional view illustrating a fastener clip and therearound along line XI-XI in FIG. 5.

As illustrated in FIG. 5, the supporting member body 31 includes a mounting hole 31B in an end portion closer to the rear of the vehicle. The mounting hole 31B is a through hole that opens in the width direction of the vehicle. A bracket 12 having an elongated shape is provided on the top surface of the tunnel portion 11. A mounting tab 13 including a mounting hole 13A (see FIG. 11) is integrally formed with the bracket 12. As illustrated in FIG. 11, a fastener clip 51 is passed through the mounting hole 31B and the mounting hole 13A. With the fastener clip 51, the supporting member body 31 is mounted to the mounting tab 13.

The fastener clip 51 includes a pin 52 and a clip body 53 including a tubular portion. After the clip body 53 is inserted in the mounting hole 31B and the mounting hole 13A, the pin 52 is inserted into the clip body 53 until the tip of the pin 52 penetrates the bottom of the tubular portion of the clip body 53. As a result, the bottom of the tubular portion of the clip body 53 expands in the radial direction thereof. The pin 52 functions as a stopper for retaining the clip body 53 in the mounting hole 13A.

Figure 10:
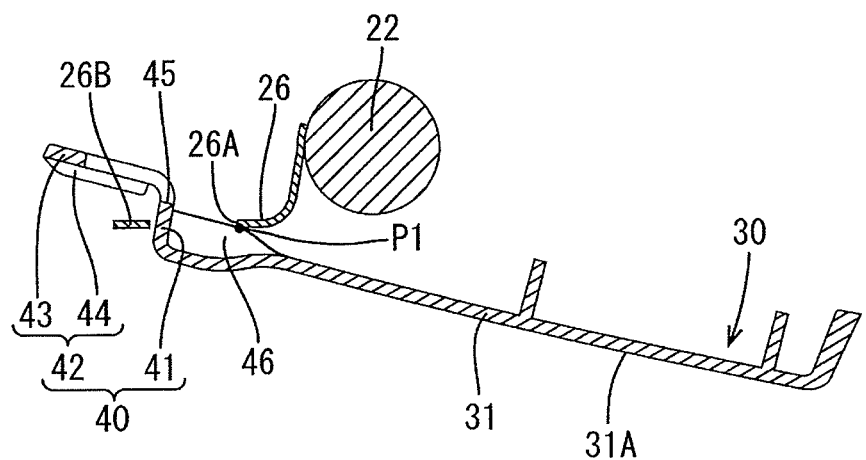
FIG. 10 is a cross-sectional view illustrating a mounting step for mounting of the carpet supporting member.

Next, steps of mounting of the carpet supporting member 30 will be described. As illustrated in FIG. 10, the mounting protrusion 40 of the carpet supporting member 30 is inserted into the mounting hole 26A of the bracket 26 from the outer rear side of the vehicle (the rear side of the vehicle and outer in the width direction of the vehicle). After the rib 46 is brought into contact with the inner wall of the mounting hole 26A, the carpet supporting member 30 is rotated counterclockwise in FIG. 10 about a contact point P1 (a center of rotation, a pivot point) at which the rib 46 contacts the inner wall of the mounting hole 26A. The second extending section 44 is brought closer to the hole edge 26B of the mounting hole 26A. As illustrated in FIG. 9, the second extending section 44 is pressed against the hole edge 26B.

As illustrated in FIG. 11, the clip body 53 is inserted into the mounting hole 31B and the mounting hole 13A and then the pin 52 is inserted into the clip body 53 and the mounting hole 13A. Through these steps, the supporting member body 31 is fixed to the mounting tab 13 with the fastener clip 51. The front end of the carpet supporting member 30 closer to the front of the vehicle is fixed with the mounting protrusion 40 and the rear end of the carpet supporting member 30 closer to the rear of the vehicle is fixed with the fastener clip 51. The mounting of the carpet supporting member 30 is complete.

According to the configuration described above, when the mounting protrusion 40 is inserted in the mounting hole 26A, the distal end portion 42 is pressed against the hole edge 26B of the mounting hole 26A from the opposite side from the supporting member body 31 side (the upper side in FIG. 9). As illustrated in FIG. 9, the rib 46 is pressed against the hole edge 26B of the mounting hole 26A from the supporting member body 31 side (the lower side in FIG. 9). With friction between the rib 46 and the hole edge 26B of the mounting hole 26A and friction between the distal end portion 42 and the hole edge 26B of the mounting hole 26A, the mounting protrusion 40 is retained. The fixing point of the supporting member body 31 with the fastener clip 51, the rib 46, and the distal end portion 42 are a point of effort, a fulcrum, and a point of load, respectively. As illustrated in FIGS. 5 and 9, a distance between the rib 46 and the distal end portion 42 in the front-rear direction of the vehicle is smaller than a distance between the rib 46 and the fastener clip 51. According to the law of the lever, the distal end portion 42 is pressed against the hole edge 26B of the mounting hole 26A with a larger force. Therefore, the mounting protrusion 40 is further properly retained. According to the configuration, the carpet supporting member 30 is mounted to the instrument panel assembly 20 with the mounting protrusion 40 inserted in the mounting hole 26A. Therefore, the number of mounting parts required for the mounting of the carpet supporting member 30 (e.g., fastener clips) can be reduced. Because the carpet supporting member 30 is mounted to the instrument panel assembly 20, extra parts are not required for the mounting of the carpet supporting member 30.

If the mounting hole 26A opens in the front-rear direction of the vehicle, the hole edge 26B is on a plane parallel to the width direction of the vehicle. Namely, the bracket 26 including the mounting hole 26A projects outward from the tunnel portion 11 in the width direction of the vehicle. This may reduce legroom. Because the mounting hole 26A is the through hole that opens in the width direction of the vehicle, the hole edge 26B is on a plane parallel to the front-rear direction of the vehicle. Namely, the bracket 26 including the mounting hole 26A projects in the front-rear direction of the vehicle. Therefore, the legroom is less likely to be reduced.

The distal end portion 42 includes the first extending section 43 and the second extending section 44. The first extending section 43 extends from the distal end of the base portion 41 toward the front of the vehicle. The second extending section 44 extends from the distal end of the first extending section 43 toward the base portion 41 side. The second extending section 44 is pressed against the hole edge 26B of the mounting hole 26A. The second extending section 44 is the flexible tab that is elastically deformable in the width direction of the vehicle. With the second extending section 44 (or the bracket 26) elastically deformed, an error in dimension measuring in the width direction of the vehicle can be compensated and thus the second extending section 44 is properly pressed against the hole edge 26B of the mounting hole 26A. Because the second extending section 44 extends from the distal end of the first extending section 43, a stress applied to the second extending section 44 is less likely to affect the base portion 41 and the supporting member body 31. Therefore, the supporting surface 31A is less likely to be curved.

The instrument panel assembly 20 includes the reinforcing shaft 21, the upper instrument panel component 25, the first brace 22, and the bracket 26. The reinforcing shaft 21 extends in the width direction of the vehicle. The upper instrument panel component 25 covers the reinforcing shaft 21 from the rear side of the vehicle and forms the design surface. The first brace 22 extends upward from the tunnel portion 11 and supports the reinforcing shaft 21. The bracket 26 projects from the periphery of the first brace 22. The bracket 26 includes the mounting hole 26A. With the bracket 26 including the mounting hole 26A is formed on the first brace 22, extra parts are not required for fixing the bracket 26 to the first brace 22.

Other Embodiments

The technology described herein is not limited to the above embodiments described above and the drawings. The following embodiments may be included in the technical scope of the present invention.

(1) The upper instrument panel component 25 may include mounting holes and the mounting protrusions 40 of the carpet supporting members 30 may be inserted in the mounting holes, respectively. Alternatively, the lower instrument panel component may include mounting holes and the mounting protrusions 40 of the carpet supporting members 30 may be inserted in the mounting holes, respectively.

(2) The distal end portion 42 may include only the first extending section 43 and the first extending portion 43 may be pressed against the hole edge 26B of the mounting hole 26A.

Figure 12:
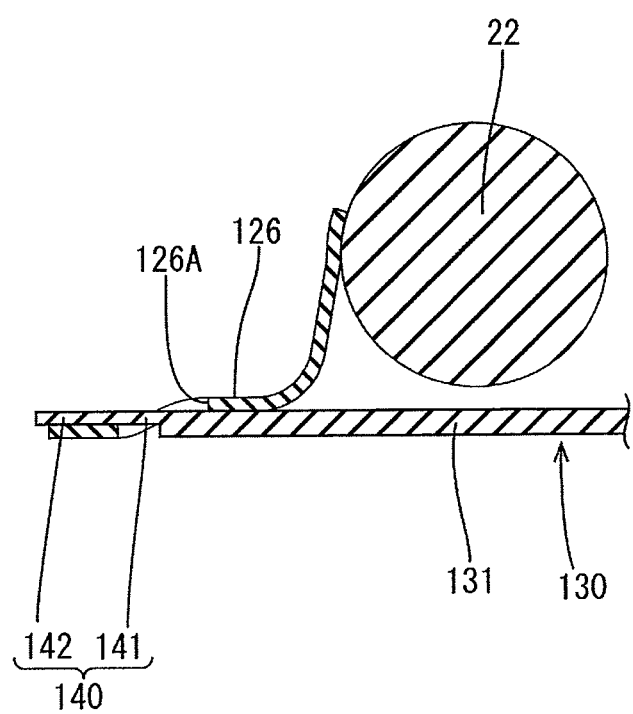
FIG. 12 is a cross-sectional view illustrating a modification the mounting protrusion of the carpet supporting member.

(3) A carpet supporting member 130 illustrated in FIG. 12 may be included in the technical scope of the present invention. The carpet supporting member 130 includes a supporting member body 131 and a mounting protrusion 140. The mounting protrusion 140 includes a base portion 141 and a distal end portion 142. The base portion 141 extends from the edge of the supporting member body 131 toward the front of the vehicle. The base portion 141 is inserted in a mounting hole 126A of a bracket 126. The distal end portion 142 extends from the distal end of the base portion 141 toward the front of the vehicle. Namely, the base portion 141 and the distal end portion 142 of the mounting protrusion 140 may extend in line. As illustrated in FIG. 12, the distal end portion 142 may have a flat plate shape.

The invention claimed is:

1. A carpet supporting member mounting structure for mounting a carpet supporting member to an instrument panel assembly to support a floor carpet including a portion to cover a tunnel portion of a floor panel of a vehicle, the carpet supporting member mounting structure comprising:

a mounting portion of the instrument panel assembly including a mounting hole that is a through hole opening in a width direction of the vehicle; and a carpet supporting member comprising:
> a supporting member body having a plate shape, the supporting member body being disposed to project upward from an upper edge of a sidewall of the tunnel portion in a direction away from the floor panel, the supporting member body including a supporting surface to support the floor carpet from one side in the width direction of the vehicle; and
> a mounting protrusion protruding from a front edge of the supporting member body, the mounting protrusion comprises:
>> a base portion inserted in the mounting hole; and
>> a distal end portion extending from a distal end of the base portion toward a front of the vehicle and being pressed against a section of a hole edge of the mounting hole in the width direction of the vehicle.

2. The carpet supporting member mounting structure according to claim 1, wherein
the distal end portion comprises:
> a first extending section extending from the distal end of the base portion toward the front of the vehicle; and
> a second extending section extending from a distal end of the first extending section toward the base portion and being pressed against the section of the hole edge of the mounting hole, and the second extending section is elastically deformable in the width direction of the vehicle.

3. The carpet supporting member mounting structure according to claim 1, wherein
the mounting portion of the instrument panel assembly is included in a brace that extends from a reinforcing member included in the instrument panel assembly to the tunnel portion and connected to the tunnel portion, and
the mounting portion projects from a periphery of the brace.

4. The carpet supporting member mounting structure according to claim 2, wherein
the first extending section has a tab shape with a cutout in a middle,
the second extending section includes a fixed end and a free end,
the fixed end is fixed to the distal end of the first extending section,
the free end hangs over the cutout of the first extending section, and
the free end is pressed against the section of the hole edge.

5. The carpet supporting member mounting structure according to claim 1, wherein
the supporting member body includes a rib protruding from a back surface of the supporting member body,
the rib includes an edge connected to the base portion of the mounting protrusion, and
the rib is pressed against a section of the hole edge different from the section of the hole edge against which the distal end portion of the mounting protrusion is pressed.

6. The carpet supporting member mounting structure according to claim 3, wherein the mounting portion of the instrument panel assembly includes a projecting section projecting from a periphery of the brace in a front direction of the vehicle and including the mounting hole.

7. The carpet supporting member mounting structure according to claim 1, further comprising a fixing member fixed to the tunnel portion, wherein the supporting member body includes a mounting portion in a rear end portion closer to a rear of the vehicle relative to the mounting protrusion, and
the mounting portion is fixed to the fixing member.

8. The carpet supporting member mounting structure according to claim 7, further comprising a fastener clip, wherein
the mounting portion of the supporting member body includes a mounting hole that is a through hole opening in the width direction of the vehicle,
the fixing member includes a mounting hole that is a through hole opening in the width direction of the vehicle and aligned with the mounting hole of the mounting portion of the supporting member body, and
the fastener clip is fitted in the mounting holes to bind the supporting member body and the fixing member.

9. The carpet supporting member mounting structure according to claim 8, wherein
the supporting member body includes a rib protruding from a back surface of the supporting member body,
the rib includes an edge connected to the base portion of the mounting protrusion,
the rib is pressed against a section of the hole edge different from the section of the hole edge against which the distal end portion of the mounting protrusion is pressed, and
the mounting hole of the mounting portion of the supporting member body is located at a position a distance from the rib greater than a distance between the rib and the distal end portion.

10. The carpet supporting member mounting structure according to claim 1, further comprising:
another mounting portion of the instrument panel assembly including a mounting hole that is a through hole opening in a width direction of the vehicle; and
another carpet supporting member comprising:
> a supporting member body having a plate shape, the supporting member body being disposed to project from an upper edge of an opposite sidewall of the tunnel portion from the sidewall, the supporting member body of the other carpet supporting member including a supporting surface to support the floor carpet from another side in the width direction of the vehicle; and
> a mounting protrusion protruding from a front edge of the supporting member body of the other carpet supporting member, the mounting protrusion comprises:
>> a base portion inserted in the mounting hole of the other mounting portion of the instrument panel assembly; and
>> a distal end portion extending from a distal end of the base portion of the other mounting portion of the instrument panel assembly toward the front of the vehicle and being pressed against a section of a hole edge of the mounting hole of the other mounting portion in the width direction of the vehicle.

11. The carpet supporting member mounting structure according to claim 10, wherein
the distal end portion of the other carpet supporting member comprises:
> a first extending section extending from the distal end of the base portion toward the front of the vehicle; and
> a second extending section extending from a distal end of the first extending section toward the base portion and being pressed against the section of the hole edge of the mounting hole, and the second extending section is elastically deformable in the width direction of the vehicle.

12. The carpet supporting member mounting structure according to claim 10, wherein the other mounting portion of the instrument panel assembly is included in another brace that extends from the reinforcing member to the tunnel portion and connected to the tunnel portion, and the mounting portion projects from a periphery of the other brace.

13. The carpet supporting member mounting structure according to claim 11, wherein the first extending section has a tab shape with a cutout in a middle, the second extending section includes a fixed end and a free end, the fixed end is fixed to the distal end of the first extending section, the free end hangs over the cutout of the first extending section, and the free end is pressed against the section of the hole edge.

14. The carpet supporting member mounting structure according to claim 10, wherein the supporting member body includes a rib protruding from a back surface of the supporting member body, wherein the rib includes an edge connected to the base portion of the mounting protrusion, and the rib is pressed against a section of the hole edge different from the section of the hole edge against which the distal end portion of the mounting protrusion is pressed.

15. The carpet supporting member mounting structure according to claim 12, wherein the other mounting portion of the instrument panel assembly includes a projecting section projecting from a periphery of the other brace in a front-rear direction of the vehicle and includes the mounting hole.

16. The carpet supporting member mounting structure according to claim 10, further comprising another fixing member fixed to the tunnel portion, wherein the supporting member body includes a mounting portion in a rear end portion closer to a rear of the vehicle relative to the mounting protrusion, and the mounting portion is fixed to the fixing member.

17. The carpet supporting member mounting structure according to claim 16, further comprising another fastener clip, wherein the mounting portion of the supporting member body includes a mounting hole that is a through hole opening in the width direction of the vehicle, the fixing member includes a mounting hole that is a through hole opening in the width direction of the vehicle and aligned with the mounting hole of the mounting portion of the supporting member body, and the other fastener clip is fitted in the mounting holes to bind the supporting member body and the fixing member.

18. The carpet supporting member mounting structure according to claim 17, wherein the supporting member body includes a rib protruding from a back surface of the supporting member body, the rib includes an edge connected to the base portion of the mounting protrusion, the rib is pressed against a section of the hole edge different from the section of the hole edge against which the distal end portion of the mounting protrusion is pressed, and the mounting hole of the mounting portion of the supporting member body is located at a position a distance from the rib greater than a distance between the rib and the distal end portion.

\* \* \* \* \*